United States Patent
Nagase et al.

(10) Patent No.: US 7,791,293 B2
(45) Date of Patent: Sep. 7, 2010

(54) MOTOR CONTROLLER AND ELECTRIC POWER STEERING SYSTEM

(75) Inventors: Shigeki Nagase, Nabari (JP); Takeshi Ueda, Kashiba (JP); Ken Matsubara, Matsubara (JP); Toshiaki Oya, Sakai (JP); Yasuyuki Yoshii, Souraku-gun (JP)

(73) Assignee: JTEKT Corporation, Osaka-shi (JP)

( * ) Notice: Subject to any disclaimer, the term of this patent is extended or adjusted under 35 U.S.C. 154(b) by 163 days.

(21) Appl. No.: 12/236,059

(22) Filed: Sep. 23, 2008

(65) Prior Publication Data
US 2009/0079373 A1  Mar. 26, 2009

(30) Foreign Application Priority Data
Sep. 26, 2007 (JP) .............................. 2007-248534

(51) Int. Cl.
*H02P 6/00* (2006.01)
*H02P 6/14* (2006.01)

(52) U.S. Cl. ............. 318/400.01; 318/700; 318/400.02; 318/400.07; 318/400.13; 318/400.12; 318/400.15; 318/400.16; 318/400.22; 318/400.42; 361/31; 361/33

(58) Field of Classification Search ............ 318/400.01, 318/400.02, 400.07, 400.12, 400.13, 400.15, 318/400.16, 400.22, 400.42, 700, 801, 432, 318/434; 361/31, 33
See application file for complete search history.

(56) References Cited

U.S. PATENT DOCUMENTS

| | | | | |
|---|---|---|---|---|
| 5,436,545 | A * | 7/1995 | Bahr et al. | 318/727 |
| 7,017,377 | B2 * | 3/2006 | Hosoito et al. | 68/12.16 |
| 7,166,975 | B2 * | 1/2007 | Mori et al. | 318/400.36 |
| 7,271,557 | B2 * | 9/2007 | Ajima et al. | 318/400.01 |
| 7,548,443 | B2 * | 6/2009 | Arisawa et al. | 363/132 |
| 2007/0013333 | A1 * | 1/2007 | Ajima et al. | 318/432 |
| 2007/0273312 | A1 * | 11/2007 | Sakurai et al. | 318/254 |

FOREIGN PATENT DOCUMENTS

| | | |
|---|---|---|
| JP | 10-167085 | 6/1998 |
| JP | 10-167086 | 6/1998 |
| JP | 2006-131191 | 5/2006 |
| JP | 2007-118823 | 5/2007 |

* cited by examiner

*Primary Examiner*—Rita Leykin
(74) *Attorney, Agent, or Firm*—Oblon, Spivak, McClelland, Maier & Neustadt, L.L.P.

(57) ABSTRACT

A current sensor of a motor controller detects the current applied to a motor drive circuit and thus a phase where a failure cannot be detected would occur without taking any measures. However, an abnormal current monitor section contained in a microcomputer receives a voltage signal of an average value of the currents detected in the current sensor by allowing a signal to pass through a first LPF having a cutoff frequency sufficiently lower than the frequency of a PWM signal. Therefore, whether or not the value is within a predetermined normal range is checked, whereby whether or not some failure containing a failure of the current sensor occurs can be easily determined about every phase.

10 Claims, 5 Drawing Sheets

| T  | x1 | x2 | x3 | ... |
|----|----|----|----|-----|
| To | y1 | y2 | y3 | ... |
| R  | a1 | a2 | a3 | ... |

MOTOR CONTROLLER AND ELECTRIC POWER STEERING SYSTEM

BACKGROUND OF THE INVENTION

This invention relates to a motor controller for controlling a brushless motor and an electric power steering system including the motor controller.

Generally, an electric power steering system for giving steering assist force to a steering mechanism of a vehicle by driving an electric motor in response to a steering torque added to a steering wheel by a driver has been used. A brush motor has been widely used as the electric motor of the electric power steering system; in recent years, a brushless motor has also been used from the viewpoints of improvement of reliability and durability, a decrease in inertia, and the like.

Generally, to control torque generated by a motor, a motor controller detects a current flowing into the motor and performs PI control (proportional-plus-integral control) based on the difference between the current to be supplied to the motor and the detected current. A motor controller for driving a three-phase brushless motor is often provided with two or three current sensors to detect current of two phases or more.

However, the number of the current sensors can be reduced to one. While the brushless motor rotates, the current value detected in each current sensor changes in response to a PWM signal. That is, within one period of the PWM signal, the current sensor may detect drive current of one phase and may detect the sum of drive currents of two phases. Then, since the sum of drive currents of three phases becomes zero, the remaining one-phase drive current can be found based on the sum of drive currents of two phases.

Relating to the invention, Japanese Patent Laid-Open No. 2007-118823 discloses a configuration for estimating the rotation angle when a rotation angle sensor of a motor is abnormal. Japanese Patent Laid-Open No. H10-167086 discloses a configuration for performing open loop control when current detection is abnormal. Further, Japanese Patent Laid-Open No. 2006-131191 discloses a configuration for using a map of an assist gradient in an assist map. Further, Japanese Patent Laid-Open No. H10-167085 discloses a configuration in which a switch connected to a power supply section is implemented as an FET.

As described above, in the motor controller provided with only one current sensor, when drive currents of two phases are actually detected, the remaining one-phase drive current is found by calculation. Therefore, if a failure occurs in the remaining one phase and an overcurrent flows or no current flows, the failure in the phase cannot be detected.

SUMMARY OF THE INVENTION

It is therefore an object of the invention to provide a motor controller that can detect a failure of every phase in a motor if only one current sensor is provided and an electric power steering system including the motor controller.

In order to achieve the object, the present invention provides the following arrangements:

(1) A motor controller for driving a brushless motor, comprising:
an inverter circuit which converts a current from a predetermined power supply based on a voltage command value for controlling driving the brushless motor and supplies the conversion result to the brushless motor to drive the brushless motor;
only one current detector provided between the inverter circuit and the power supply for detecting a current given from the power supply to the inverter circuit;
an each-phase current value acquisition unit which acquires a current value of each phase of the brushless motor based on the current detected by the current detector;
a low-pass filter which time-averages the current detected by the current detector;
an average current value acquisition unit which receives the time-averaged current from the low-pass filter; and
a controller which finds the voltage command value based on the command current value indicating the current amount to be supplied to the brushless motor and the current value acquired by the each-phase current value acquisition unit.

(2) The motor controller according to (1), wherein the average current value acquisition unit detects the malfunction if the received current amount is out of a predetermined normal range.

(3) The motor controller according to (1), wherein
the inverter circuit includes a plurality of switch elements, and
the low-pass filter has a cutoff frequency lower than a frequency of a pulse signal given to the switch elements.

(4) The motor controller according to (2), wherein the controller includes:
a feedback controller which performs a feedback control to find the voltage command value;
an open loop controller which performs an open-loop control to find the voltage command value; and
a command voltage selector which selects one of the voltage command value output from the feedback controller and the voltage command value output from the open loop controller,
wherein when the average current value acquisition unit does not detect the malfunction, the command voltage selector selects the voltage command value output from the feedback controller, and when the average current value acquisition unit detects the malfunction, the command voltage selector selects the voltage command value output from the open loop controller.

(5) The motor controller according to (2) further comprising a fail-safe controller performs fail-safe control when the average current value acquisition unit detects the malfunction.

(6) An electric power steering system comprising a motor controller according to any one of (1) to (5).

According to the above invention, the average current value acquisition unit, for example, functioning as a monitor, etc., receives the time-averaged current from the low-pass filter. Thus, if only one current detector is provided between the inverter circuit and the power supply, the current value applied to the inverter circuit from the power supply can be detected regardless of the current value of the phase that can be actually detected by the current detector, so that a failure of every phase in the inverter circuit and the motor can be detected, for example.

According to the above invention, the average current value acquisition unit functions as a monitor for detecting an malfunction when the received current amount is out of the predetermined normal range, so that a failure of every phase in the inverter circuit and the motor can be detected.

According to the above invention, the cutoff frequency of the low-pass filter is lower than the frequency of a pulse signal of a PWM signal, etc., so that time averaging the current of each phase can be performed to an extent sufficient to detect a failure of each phase.

According to the above invention, a failure of every phase in the inverter circuit and the motor can be detected, so that safe steering assisting is made possible.

DETAILED DESCRIPTION OF PREFERRED EMBODIMENTS

<1. General Configuration of Electric Power Steering System>

Figure 1:
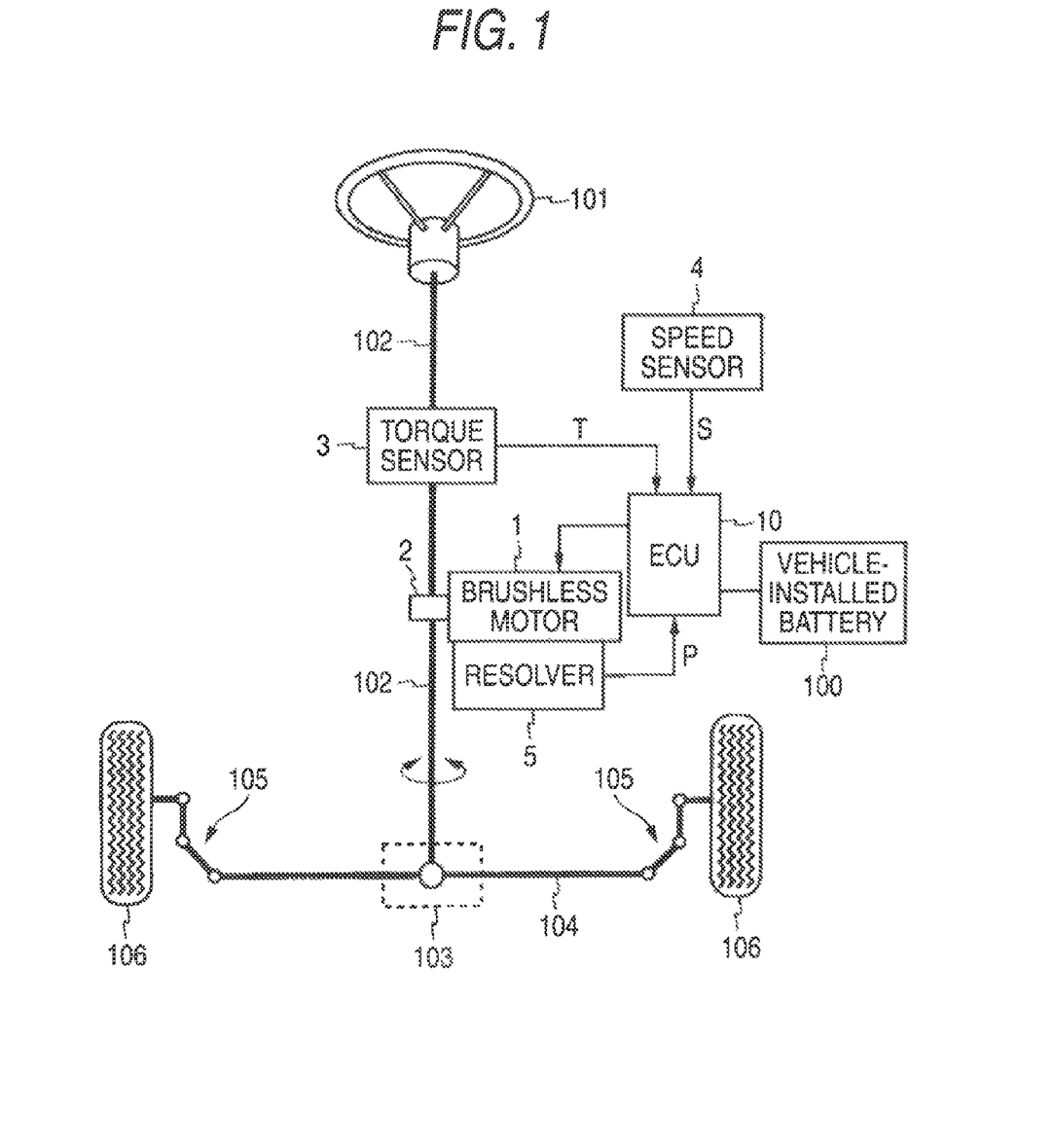
FIG. 1 is a schematic drawing to show the configuration of an electric power steering system according to an embodiment of the invention.

FIG. 1 is a schematic drawing to show the configuration of an electric power steering system according to an embodiment of the invention together with the configuration of a vehicle relevant to the electric power steering system. The electric power steering system shown in FIG. 1 is an electric power steering system of column assist type including a brushless motor 1, a speed reducer 2, a torque sensor 3, a speed sensor 4, a resolver 5, and an electronic control unit (ECU) 10.

As shown in FIG. 1, a steering wheel 101 is fixedly secured to one end of a steering shaft 102 and an opposite end of the steering shaft 102 is jointed to a rack shaft 104 through a rack and pinion mechanism 103. Opposite ends of the rack shaft are respectively jointed to wheels 106 through joint members 105 each made up of a tie rod and a steering knuckle arm. When a driver turns the steering wheel 101, the steering shaft 102 rotates and accordingly the rack shaft 104 performs reciprocating motion. The directions of the wheels 106 change with the reciprocating motion of the rack shaft 104.

To lighten the load for the driver, the electric power steering system performs the following steering assistance. The torque sensor 3 detects a steering torque T added to the steering shaft 102 as the driver operates the steering wheel 101. The speed sensor 4 detects vehicle speed S. The resolver 5 detects a rotation position P of a rotor of the brushless motor 1. The resolver 5 may be a sensor that can detect a position; for example, it may be a hall sensor, an MR sensor, etc.

The ECU 10 receives supply of power from a vehicle-installed battery 100 and drives the brushless motor 1 based on the steering torque T, the vehicle speed S, and the rotation position P of the rotor. When the brushless motor 1 is driven by the ECU 10, it generates a steering assisting force. The speed reducer 2 is provided between the brushless motor 1 and the steering shaft 102. The steering assisting force generated in the brushless motor 1 acts so as to rotate the steering shaft 102 through the speed reducer 2.

Consequently, the steering shaft 102 rotates by both the steering torque added to the steering wheel 101 and the steering assisting force generated in the brushless motor 1. Thus, the electric power steering system performs steering assistance by giving the steering assisting force generated in the brushless motor 1 to the steering mechanism of the vehicle.

The electric power steering system according to the embodiment of the invention is characterized by a controller (motor controller) for driving the brushless motor 1. Then, the motor controller included in the electric power steering system according to one embodiment will be discussed below.

<2. General Configuration and Operation of Motor Controller>

Figure 2:
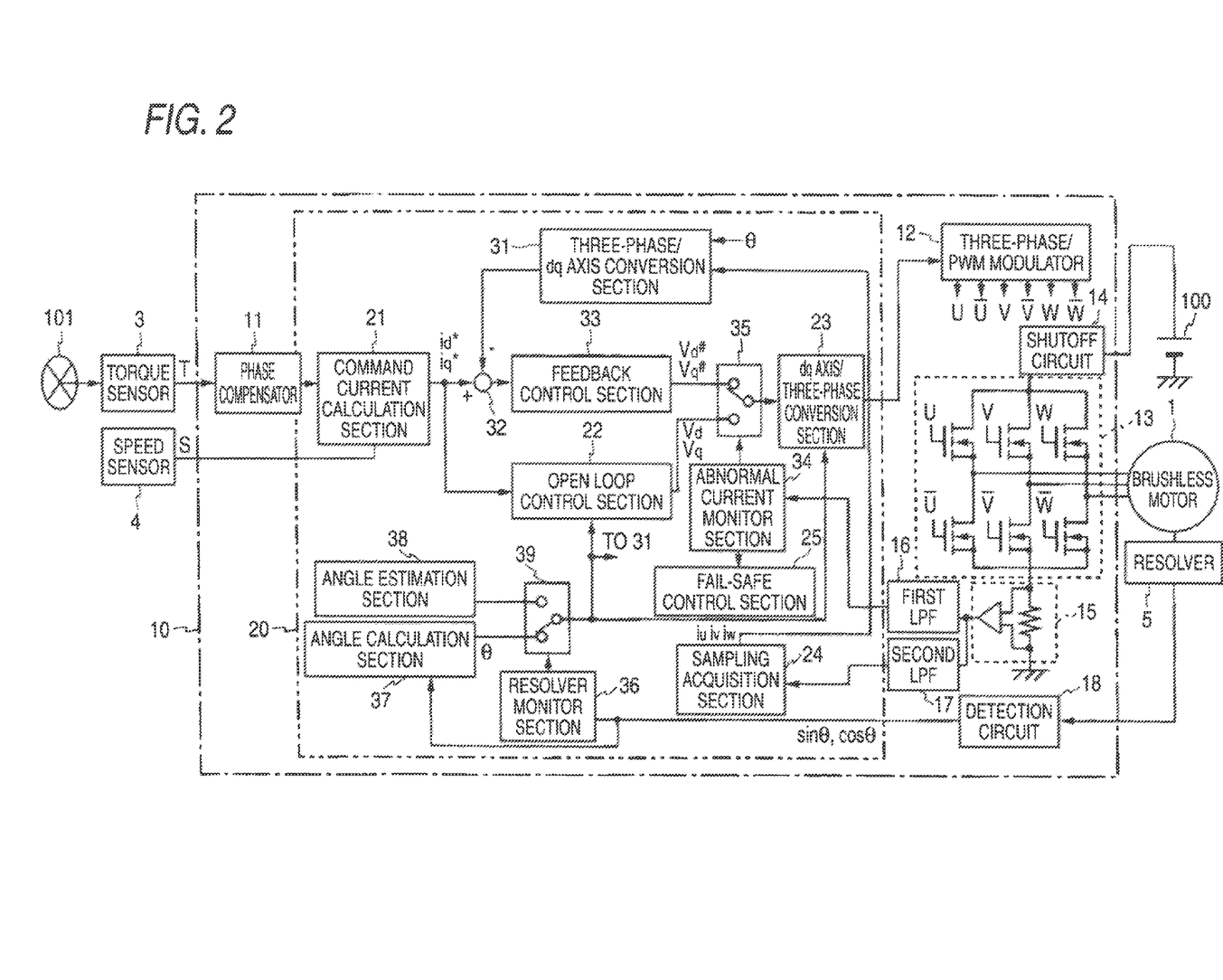
FIG. 2 is a block diagram to show the configuration of a motor controller in the embodiment of the invention.

FIG. 2 is a block diagram to show the configuration of the motor controller according to one embodiment of the invention. The motor controller shown in FIG. 2 is implemented using the ECU 10 and drives the brushless motor 1 having a three-phase winding of a u phase, a v phase, and a w phase (not shown). The ECU 10 includes a phase compensator 11, a microcomputer 20, a three-phase/PWM (Pulse Width Modulation) modulator 12, a motor drive circuit (inverter circuit) 13, a shutoff circuit 14, and a current sensor 15.

Signals indicating the steering torque T output from the torque sensor 3, the vehicle speed S output from the speed sensor 4, and the rotation position P of the rotor output from the resolver 5 are input to the ECU 10. The phase compensator 11 performs phase compensation for the steering torque T. The microcomputer 20 functions as a controller for finding a voltage command value used for driving the brushless motor 1. The function of the microcomputer 20 is described later in detail.

The three-phase/PWM modulator 12 and the motor drive circuit 13 are implemented as hardware (circuit) and function as a motor driver for driving the brushless motor 1 based on the voltage command value found by the microcomputer 20 (which will be hereinafter also referred to as command voltage). The three-phase/PWM modulator 12 generates three types of PWM signals (U, V, and W shown in FIG. 2) having a duty ratio responsive to the voltage levels of three phases found by the microcomputer 20. The motor drive circuit 13 is a PWM voltage source inverter circuit including six MOSFETs (Metal Oxide Semiconductor Field Effect Transistors) as switching elements. These six MOSFETs are controlled by the three types of PWM signals and negation signals thereof. The conduction state of each of the MOSFETs is controlled using the PWM signals, whereby drive currents of three phases (U phase current, V phase current, and W phase current) are supplied to the brushless motor 1. Thus, the motor drive circuit 13 functions as an inverter circuit having a plurality of switching elements for supplying a current to the brushless motor 1.

The shutoff circuit 14 is provided between the battery 100 and the motor drive circuit 13 and prevents an overcurrent from flowing into the motor drive circuit 13 and also protects the motor drive circuit 13 if the battery 100 is inversely connected by mistake. Generally, a power shutoff relay is used as the shutoff circuit 14, but MOSFET is used in the embodiment. The detailed configuration of the shutoff circuit 14 is described later.

The current sensor 15 functions as a current detector for detecting a current flowing into the brushless motor 1. The current sensor 15 includes one resistance element having one end connected to the motor drive circuit 13 and an opposite end grounded and a differential amplification circuit for detecting the voltage across the resistance element, as shown in FIG. 2. Since the resistance element is thus inserted between the motor drive circuit 13 and the ground point, the current (at a predetermined point in time) applied to the motor drive circuit 13 is detected unlike a configuration for individually and actually detecting currents of phases of a motor using a plurality of resistors.

While the brushless motor 1 rotates, the current value detected in the current sensor changes in response to the PWM signal. Therefore, as described above, within one period of the PWM signal, the current sensor may detect drive current of one phase and may detect the sum of drive currents of two phases. Then, at this timing, drive currents are detected by a sampling acquisition section 24 described later, thereby finding the remaining one-phase drive current based on the sum of the drive currents of two phases. Thus, while the brushless motor 1 rotates, one current sensor 15 can be used to detect drive currents of three phases. Thus, to detect the drive current in the embodiment, drive current detection by calculation is also included in addition to actual detection of flowing drive currents.

A voltage signal corresponding to the current value detected by the current sensor 15 is given to a first low-pass filter (first LPF) 16 and a second low-pass filter (second LPF) 17. An output signal from the first LPF 16 is given to an abnormal current monitor section 34 of the microcomputer 20 as a voltage value through an A/D conversion section (not shown), and an output signal from the second LPF 17 is given to the sampling acquisition section 24 of the microcomputer 20 as a voltage value through the A/D conversion section (not shown). The invention is characterized by the first LPF 16 having a cutoff frequency sufficiently lower than the frequency of the PWM signal and the second LPF 17 having a cutoff frequency sufficiently higher than the frequency of the PWM signal. The components relevant to the current sensor 15 are described later in detail.

In the example shown in FIG. 2, the current sensor 15 is provided between the motor drive circuit 13 and the minus side of the power supply (ground point), but may be provided between the motor drive circuit 13 and the plus side of the power supply (here, the shutoff circuit 14).

The microcomputer 20 functions as a command current calculation section 21, an open loop control section 22, a subtraction section 32, a feedback control section 33, a dq axis/three-phase conversion section 23, the sampling acquisition section 24, a three-phase/dq axis conversion section 31, the abnormal current monitor section 34, a resolver monitor section 36, an angle calculation section 37, an angle estimation section 38, a fail-safe control section 25, a command voltage selection section 35, and an angle selection section 39 by executing a program stored in memory (not shown) contained in the ECU 10.

When the current sensor 15, etc., operates normally, the microcomputer 20 performs feedback control. When a failure occurs in the current sensor 15, the microcomputer 20 performs fail-safe control (described later) and performs open loop control. When the resolver 5 fails, the rotor rotation angle estimated by the angle estimation section 38 is used. The components will be discussed below in detail:

<2. General Configuration and Operation of Motor Controller>

The command current calculation section 21 finds a d axis current and a q axis current to be supplied to the brushless motor 1 (hereinafter, the former will be referred to as d axis command current id* and the latter will be referred to as q axis command current iq*) based on the steering torque T after subjected to phase compensation (output signal of the phase compensator 11) and the vehicle speed S. More particularly, the command current calculation section 21 contains a map (assist map with gradient) in which a table storing the correspondence relationship between the steering torque T and the steering assisting force corresponding to a command current (basic assist torque To) with employing the vehicle speed S as a parameter (basic assist map) is provided with a curve gradient (assist gradient) indicating the correspondence relationship. The command current calculation section 21 references the assist map with gradient to find a command current.

A configuration in which when a steering torque of one magnitude is given, the d axis command current id* and the q axis command current iq* to be supplied to the brushless motor 1 are found to generate the steering assisting force of an appropriate magnitude responsive to that magnitude using the basic assist map is well known, but a configuration using the assist map with gradient provided by adding the assist gradient is not known. This configuration is described later in detail.

The q axis command current iq* found in the command current calculation section 21 is a signed current value and the sign indicates the steering assisting direction. For example, when the sign is plus, steering assisting to curve to the right direction is performed and when the sign is minus, steering assisting to curve to the left direction is performed. The d axis command current id* typically is set to zero.

The sampling acquisition section 24 samples the voltage signal given from the second LPF 17 at predetermined timings within one period of the PWM signal, namely, when the current sensor 15 detects drive current of one phase and detects the sum of drive currents of two phases, and further finds the remaining one-phase drive current based on the sum of the drive currents of two phases, thereby individually detecting the drive currents of three phases to be supplied to the brushless motor 1. That is, the sampling acquisition section 24 functions as an each-phase current value acquisition unit for acquiring the current value of each phase. The detected current values of three phases (u phase detection current iu, v phase detection current iv, and w phase detection current iw) are given to the three-phase/dq axis conversion section 31. The sampling frequency in the sampling acquisition section 24 is set to the same as the frequency of the PWM signal.

The second LPF 17 has a cutoff frequency sufficiently higher than the frequency of the PWM signal given to the six FETs included in the motor drive circuit 13 and thus can shut off the noise component of a frequency higher than the cutoff frequency. Therefore, the sampling acquisition section 24 can receive a voltage signal with reduced high frequency noise from the second LPF 17 and malfunction is prevented.

The angle calculation section 37 finds the rotation angle of the rotor of the brushless motor 1 (which will be hereinafter referred to as angle θ) based on signals relevant to the rotation position of the rotor detected by the resolver 5 (and a detection circuit 18 thereof), specifically a signal provided by amplitude-modulating an excitation signal from an excitation signal generation section (not shown) given to the resolver 5 at sin θ and a signal provided by amplitude-modulating the excitation signal at cos θ. As known, the angle θ is the angle which u and d axes form with each other when u, v, and w axes are set for the brushless motor 1 and d and q axes are set for the rotor 6 of the brushless motor 1.

The three-phase/dq axis conversion section 31 finds a d axis detection current id and a q axis detection current iq from the following expressions (1) and (2) based on the u phase detection current iu and the v phase detection current iv received from the sampling acquisition section 24 and the angle θ from the angle calculation section 37 or an estimated angle θ from the angle estimation section 38 (described later) selected by the angle selection section 39:

$$id=\sqrt{2}\times\{Iv\times\sin\theta - Iu\times\sin(\theta-2\pi/3)\} \quad (1)$$

$$iq=\sqrt{2}\times\{Iv\times\cos\theta - Iu\times\cos(\theta-2\pi/3)\} \quad (2)$$

The subtraction section 32 finds a deviation Ed between the d axis command current id* received from the command current calculation section 21 and the d axis detection current id received from the three-phase/dq axis conversion section 31 and a deviation Eq between the q axis command current iq* received from the command current calculation section 21 and the q axis detection current iq received from the three-phase/dq axis conversion section 31.

The feedback control section 33 performs proportional plus integral operations shown in the following expressions (3) and (4) on the deviations Ed and Eq, thereby finding a d axis command voltage $vd^{\#}$ and a q axis command voltage $vq^{\#}$:

$$vd^{\#}=K\times\{Ed+(1/T)\int Ed\cdot dt\} \quad (3)$$

$$vq^{\#}=K\times\{Eq+(1/T)\int Eq\cdot dt\} \quad (4)$$

where K is a proportional gain constant and T is integration time.

When the abnormal current monitor section 34 determines that no failure occurs, the command voltage selection section 35 outputs the d axis command voltage $vd^{\#}$ and the q axis command voltage $vq^{\#}$ found in the feedback control section 33. When the resolver monitor section 36 determines that a failure occurs, the command voltage selection section 35 outputs a d axis command voltage vd and a q axis command voltage vq found in the open loop control section 22. The abnormal current monitor section 34 is described later in detail.

When feedback control is performed, namely, when the abnormal current monitor section 34 determines that no failure occurs, the dq axis/three-phase conversion section 23 converts the d axis command voltage $vd^{\#}$ and the q axis command voltage $vq^{\#}$ found in the feedback control section 33 into command voltages on three-phase AC coordinate axes. More particularly, the dq axis/three-phase conversion section 23 finds a u phase command voltage Vu, a v phase command voltage Vv, and a w phase command voltage Vw from the following expressions (5) to (7) based on the d axis command voltage $vd^{\#}$ and the q axis command voltage $vq^{\#}$ and the angle θ from the angle calculation section 37 or the estimated angle θ from the angle estimation section 38 (described later) selected by the angle selection section 39:

$$Vu=\sqrt{(2/3)}\times\{vd^{\#}\times\cos\theta - vq^{\#}\times\sin\theta\} \quad (5)$$

$$Vv=\sqrt{(2/3)}\times\{vd^{\#}\times\cos(\theta-2\pi/3) - vq^{\#}\times\sin(\theta-2\pi/3)\} \quad (6)$$

$$Vw=-Vu-Vv \quad (7)$$

Thus, the microcomputer 20 performs processing of finding the command currents id* and iq* on the dq coordinate axis and processing of converting the command voltages $vd^{\#}$ and $Vq^{\#}$ into the three-phase command voltages Vu, Vv, and Vw. The three-phase/PWM modulator 12 outputs the three types of PWM signals based on the three-phase command voltages Vu, Vv, and Vw found by the microcomputer 20. Accordingly, a sinusoidal current responsive to the command voltage of each phase flows into the three-phase winding of the brushless motor 1 and the rotor of the brushless motor 1 rotates. Accordingly, a torque responsive to the current flowing through the brushless motor 1 occurs on the rotation shaft of the brushless motor 1. The occurring torque is used for steering assistance.

The feedback control as described above is performed assuming that the current sensor 15 detects the actual current flowing into the brushless motor 1, and thus cannot be executed if the current sensor 15 fails. Then, the microcomputer 20 finds the voltage (command voltage) to be given to the motor drive circuit 13 in accordance with a circuit equation of the motor based on the command current value indicating the amount of the current to be supplied to the brushless motor 1 and the angular speed of the rotor of the brushless motor 1. Such open loop control is described later.

The motor controller according to the embodiment is provided with only one current sensor. Therefore, according to the motor controller according to the embodiment, miniaturization, cost reduction, and lower power consumption of the motor controller are made possible by decreasing the number of current sensors. Next, the abnormal current monitor section 34 and the first and second LPFs 16 and 17 associated therewith will be discussed.

<3. Operation of Abnormal Current Monitor Section, Etc.>

The abnormal current monitor section 34 determines whether or not the current sensor 15 fails, but cannot examine whether or not each of the current values of three phases is in the normal range to determine whether or not the current sensor 15 fails. The current sensor 15 actually detects only the drive currents of two phases as described above and the remaining one-phase drive current is found by calculation without being actually detected. Thus, if the remaining one-phase drive current is abnormal, it cannot be detected. Thus, if the abnormal current monitor section 34 receives a current from the current sensor 15 through the second LPF 17 having a cutoff frequency sufficiently higher than the frequency of the PWM signal (for example, about 20 KHz), the abnormal current monitor section 34 cannot determine a failure for every phase.

However, the abnormal current monitor section 34 in the embodiment receives a current from the current sensor 15 through the first LPF 16 having a cutoff frequency (for example, about 20 to 200 Hz) sufficiently lower than the frequency of the PWM signal and thus can determine a failure for every phase.

That is, since the first LPF 16 is a low-pass filter having a large time constant, the signal voltage values changing within the period of the PWM signal are almost averaged. In other words, the abnormal current monitor section 34 functions as an average current value acquisition unit. Therefore, if the averaged voltage value is out of the range at the normal operation time, there is a possibility that a failure (specifically, a failure of an amplifier contained in the current sensor 15, a break or a short circuit of wiring, etc.,) may occur in the current sensor 15. Of course, there is also a possibility that a failure of flow of an abnormal current (for example, a high current which should not essentially flow) in any one or more of the three phases in the brushless motor 1 or the motor drive circuit 13 or a failure of no current flow in any one or more of the three phases may occur with no failure in the current sensor 15.

Then, the abnormal current monitor section 34 checks whether or not the value of the voltage signal output from the first LPF 16, the average value of the currents detected in the current sensor 15, is in a predetermined normal range, and determines whether or not any failure containing a failure of the current sensor 15 occurs. If it is determined that a failure occurs, the abnormal current monitor section 34 gives a failure determination signal indicating a failure to the fail-safe control section 25 and the command voltage selection section 35.

Upon reception of the failure determination signal from the abnormal current monitor section 34, the fail-safe control section 25 performs fail-safe control to stop the electric power steering system with safety and also informs the driver of failure occurrence using a warning beep, a warning lamp, etc. The fail-safe control may be any if it is a mode in which quick stopping of the electric power steering system is prevented; a known control mode such as control of gradually decreasing the steering assisting force or life extension control tentatively performed can be used.

Thus, the abnormal current monitor section 34 does not receive the signal from the current sensor 15 in the form in which the sampling acquisition section 24 actually detects only the drive currents of two phases of three phases as it is (here, through the second LPF 17 for shutting off a high frequency noise component), but receives the current corresponding to the average value of the current applied to the motor drive circuit 13 through the first LPF 16. Accordingly, the abnormal current monitor section 34 can easily find out an malfunction in every phase containing the drive current of a phase not actually detected. Thus, the electric power steering system installing the motor controller can perform steering assisting with safety.

A configuration in which the abnormal current monitor section 34 is provided with a sampling function like the sampling acquisition section 24 for detecting the drive currents of all three phases is also possible. In the configuration, however, if the sampling frequency is on a level with the PWM frequency, the drive currents cannot be detected, and the sampling frequency needs to be set to a considerably high frequency relative to the PWM frequency. Thus, the manufacturing cost becomes extremely high and the configuration is not preferred. Next, the open loop control will be discussed in detail.

<4. Operation of Open Loop Control Section>

As described above, if the abnormal current monitor section 34 determines that a failure occurs, the abnormal current monitor section 34 gives a failure determination signal to the command voltage selection section 35. The command voltage selection section 35 outputs the d axis command voltage $vd^\#$ and the q axis command voltage $vq^\#$ found in the feedback control section 33 at the normal operation time when a failure determination signal is not received from the abnormal current monitor section 34. The command voltage selection section 35 outputs the d axis command voltage vd and the q axis command voltage vq found in the open loop control section 22 at the abnormal operation time when a failure determination signal is received.

If only the drive current phase not actually detected by the current sensor 15 is abnormal, although usual feedback control can be performed, which phase is abnormal cannot be determined in the configuration shown in FIG. 2. Then, it is assumed that open loop control is performed until the system is stopped by the fail-safe control section 25. If the two phases actually detected by the sampling acquisition section 24 are normal, the abnormal current monitor section 34 may perform feedback control as it is without giving a failure determination signal to the command voltage selection section 35.

The open loop control section 22 finds a d axis voltage (which will be hereinafter referred to as "d axis command voltage vd") and a q axis voltage (which will be hereinafter referred to as "q axis command voltage vq") to be supplied to the brushless motor 1 based on the d axis command current $id^*$, the q axis command current $iq^*$, and angular speed $\omega e$ obtained by differentiating the angle $\theta$ with respect to the time. The d axis command voltage vd and the q axis command voltage vq are calculated using circuit equations of the motor shown in the following expressions (8) and (9):

$$vd = (R+PLd)id^* - \omega e L q iq^* \qquad (8)$$

$$vq = (R+PLq)iq^* + \omega e L d id^* + \omega e \Phi \qquad (9)$$

where vd is the d axis command voltage, vq is the q axis command voltage, $id^*$ is the d axis command current, $iq^*$ is the q axis command current, $\omega e$ is the angular speed of the rotor, R is armature winding resistance, Ld is self-inductance of q axis, $\Phi$ is $\sqrt{(3/2)}$ times the maximum value of the number of U, V, W phase armature winding flux linkages, and P is a differential operator. R, Ld, Lq, and $\Phi$ are handled as known parameters.

As described above, the microcomputer 20 performs processing of finding the command currents $id^*$ and $iq^*$ on the dq coordinate axis, processing of finding the command voltages vd and vq on the dq coordinate axis in accordance with the circuit equations of the motor, and processing of converting the command voltages vd and vq into the three-phase command voltages Vu, Vv, and Vw. Further, when the current sensor 15 operates normally, the open loop control section 22 may calculate the number of armature winding flux linkages $\Phi$ based on the current value ia detected in the current sensor 15, the angle $\theta$ calculated in the angle calculation section 37, and the angular speed we of the differential value of the angle $\theta$. In this case, the command voltages are found by the open loop control in accordance with the circuit equations of the motor based on the command current value and the angular speed of the rotor, and $\Phi$ contained in the circuit equation of the motor is found based on the current value detected in the current sensor 15. When the command voltages are found by using the calculated $\Phi$ value, even if the actual $\Phi$ value varies depending on manufacturing variations or temperature change, the brushless motor can be driven with high accuracy to provide any desired motor output by finding the $\Phi$ value based on the current value detected in the current sensor 15.

As described above, while the current sensor operates normally, the motor controller according to the embodiment performs feed back control of performing proportional plus integral operation on the difference between the command current value and the current value detected in the current sensor 15 to find the command voltage and drives the brushless motor with high accuracy. When feedback control cannot be performed, the motor controller can perform open loop control, thereby driving the brushless motor without detecting the current value to provide any desired motor output.

Next, the operation of the resolver monitor section 36 for monitoring occurrence of a failure in the resolver 5 and the detection circuit 18 thereof and the operation of the angle estimation section 38 used when a failure occurs will be discussed in detail.

<5. Operation of Resolver Monitor Section, Etc.>

The resolver monitor section 36 receives the values of $\sin \theta$ and $\cos \theta$ provided by detecting a signal from the resolver 5 by the detection circuit 18 and determines whether or not the values are in a predetermined normal value range. For example, the resolver monitor section 36 calculates the value of $\sin^2 \theta + \cos^2 \theta$ to use the fact that $\sin^2 \theta + \cos^2 \theta = 1$ and if the calculated value is 1 or a nearby value, the resolver monitor section 36 determines that the values of $\sin \theta$ and $\cos \theta$ are in the normal value range; otherwise, the resolver monitor section 36 determines that the values of sin θ and cos θ are out of the normal value range.

The resolver monitor section 36 may determine whether or not a combination of the values of sin θ and cos θ is in a normal value combination range predetermined in the form of a predetermined table (map).

If the resolver monitor section 36 determines that the received values are in the normal value range, the resolver monitor section 36 switches the angle selection section 39 so as to select the angle θ calculated by the angle calculation section 37; if the resolver monitor section 36 determines that the received values are out of the normal value range, the resolver monitor section 36 switches the angle selection section 39 so as to select the estimated angle θ calculated by the angle estimation section 38. The angle θ or the estimated angle θ selected by the angle selection section 39 is given to the open loop control section 22, the dq axis/three-phase conversion section 23, and the three-phase/dq axis conversion section 31.

The angle estimation section 38 calculates the estimated angle θ according to a known technique of estimating the angle based on the counter electromotive force of the brushless motor 1. However, if the rotation speed of the brushless motor 1 is less than a certain degree of rotation speed, it becomes impossible or extremely difficult to calculate the estimated angle based on the counter electromotive force. Thus, the estimated angle θ may be calculated by finding motor inductance. A known configuration to multiply the average value of steering torque within a predetermined time by a predetermined gain and calculate the multiplication result as a motor angle change amount may be adopted.

As described above, if it becomes impossible to use the angle θ of the brushless motor 1 as the resolver 5 fails, the resolver monitor section 36 detects the failure and the estimated angle θ calculated by the angle estimation section 38 is used as the angle θ of the motor, whereby the minimum steering assisting can also be continued without quickly stopping the steering assisting at the failure time, so that the load on the driver at the failure occurrence time can be lightened. Next, the detailed configuration and operation of the shutoff circuit 14 will be discussed.

<6. Configuration and Operation of Shutoff Circuit>

The shutoff circuit 14 has the function of preventing an overcurrent from flowing into the motor drive circuit 13 and the function of protecting the motor drive circuit 13 if the battery 100 is inversely connected by mistake as described above. Generally, a power shutoff relay is used as the shutoff circuit 14; in the embodiment, however, an n-channel MOSFET is used.

Figure 3:
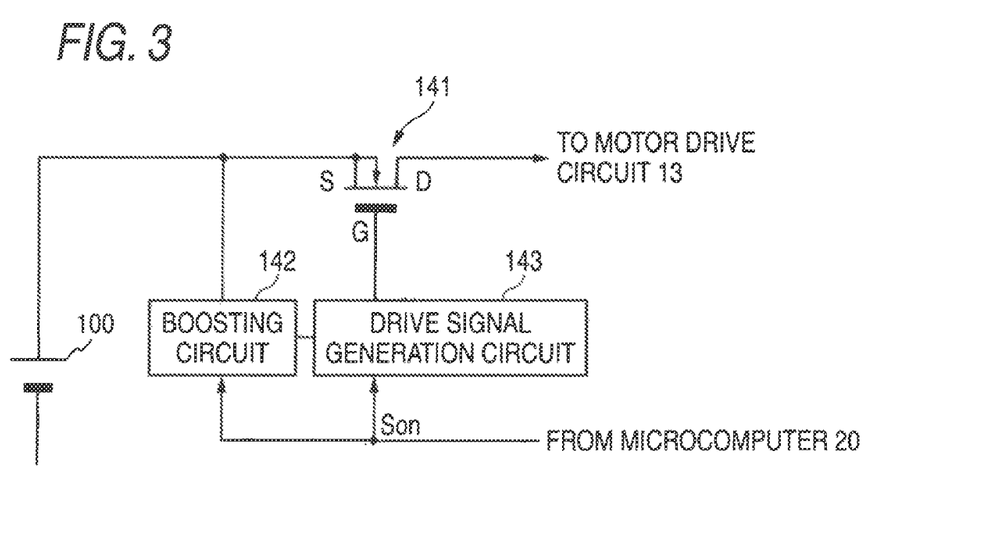
FIG. 3 is a circuit diagram to briefly show the configuration of a shutoff circuit in the embodiment of the invention.

FIG. 3 is a circuit diagram to briefly show the configuration of the shutoff circuit 14. As shown in FIG. 3, the shutoff circuit 14 includes an n-channel MOSFET 141, a boosting circuit 142, and a drive signal generation circuit 143.

The n-channel MOSFET 141 has a source connected to the battery 100 and a drain connected to one end of the motor drive circuit 13 and functions as a switch for allowing a current to flow from the battery 100 to the motor drive circuit 13 when the n-channel MOSFET 141 is turned on. A current does not flow from the motor drive circuit 13 to the battery because of the diode characteristic of the n-channel MOSFET. Therefore, if the battery 100 is inversely connected by mistake, no current flows and the motor drive circuit 13 is protected.

Upon reception of a start signal Son given when the system starts from the microcomputer 20, the boosting circuit 142 boosts the voltage given to the source of the n-channel MOSFET 141. Upon reception of the start signal Son, the drive signal generation circuit 143 gives a signal for turning on the n-channel MOSFET 141 to a gate thereof based on the voltage boosted by the boosting circuit 142. Therefore, when the system does not start, the connection relationship (simply, connection) between the motor drive circuit 13 and the battery 100 is shut off by the n-channel MOSFET 141 and they are connected only when the system starts.

Figure 4A:
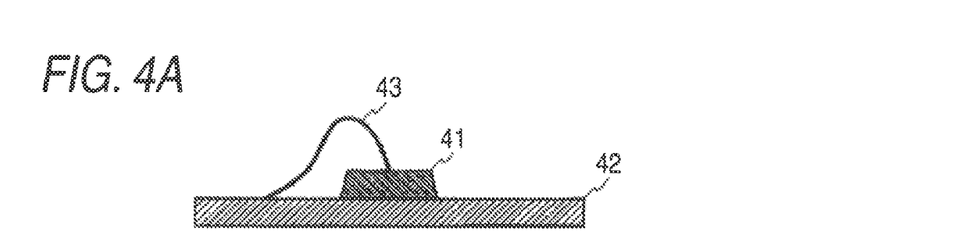
FIGS. 4A and 4B are sectional views to simply show the structure of an n-channel MOSFET in the embodiment of the invention.
Figure 4B:
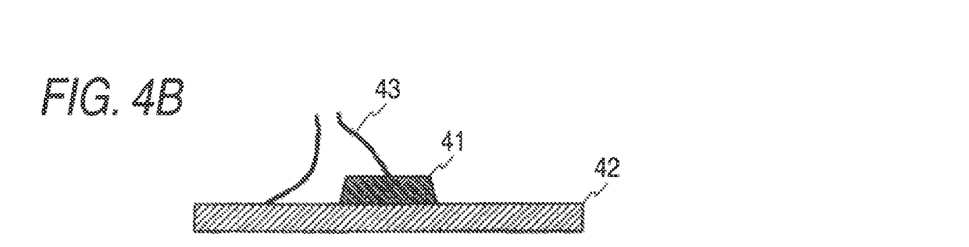

The n-channel MOSFET 141 has a structure in which when an overcurrent flows during connection, the connection is shut off. FIGS. 4A and 4B are sectional views to simply show the structure of the n-channel MOSFET; more particularly, FIG. 4A shows the structure of the n-channel MOSFET before an overcurrent flows and FIG. 4B shows the structure of the n-channel MOSFET with connection shut off after an overcurrent flows.

As seen in FIG. 4A, the n-channel MOSFET 141 is a bare chip 41 and is provided on a board 42 and is bonded by a wire 43. To bond a general bare chip, preferably resistance of a wire is small as much as possible and thus the wire is made up of four very thick aluminum lines (each having a diameter of 500 μm), for example. However, the wire 43 is formed so as to have considerably larger resistance than such a general wire, specifically so as to have a resistance value considerably larger than the on resistance of the n-channel MOSFET 141. To have such a resistance value, the wire 43 is made up of a smaller number of lines than the general wire, for example, less than four lines or the wire 43 is formed thinner than the general wire, for example, less than 500 μm in diameter. Of course, the wire 43 may satisfy both the conditions.

As described above, if the resistance value of the wire 43 is considerably larger than the on resistance of the n-channel MOSFET 141, when an overcurrent flows into the n-channel MOSFET 141, the wire 43 quickly generates heat and thus melts before the bare chip 41 is thermally destroyed, and the connection is shut off. Therefore, the wire 43 needs to be a material melting when an overcurrent flows. The wire 43 enables the connection to be shut off before the bare chip 41 operates abnormally due to thermal destruction without providing a new fuse, etc.

Particularly, a large current is allowed to flow into an electric power steering system installed in a large-sized vehicle having been sharply grown in demand in recent years. Thus, a power shutoff relay generally used with the system becomes upsized and increased in cost and inhibits miniaturization and cost reduction of the whole system. However, miniaturization and cost reduction of the system can be accomplished according to the above-described configuration using the small and inexpensive MOSFET without using such a power shutoff relay.

<7. Configuration and Operation Relevant to Assist Map>

As described above, a general assist map is a table storing the correspondence relationship between the steering torque T and the command current. In the embodiment, assist gradient R which is the gradient of the correspondence relationship in the assist map is further associated. The configuration and the operation of the command current calculation section 21 containing the assist map with gradient will be discussed in detail with reference to FIGS. 5 and 6.

Figure 5:
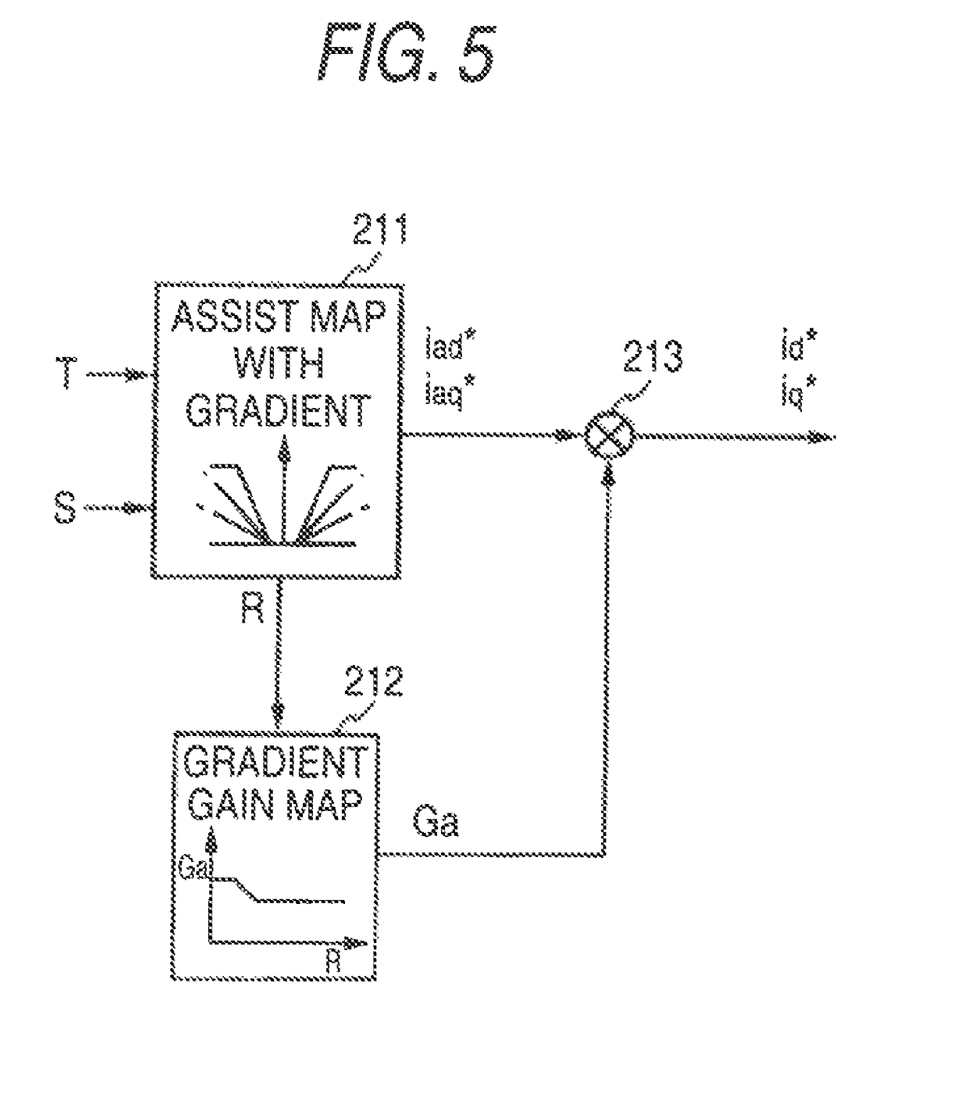
FIG. 5 is a block diagram to show the detailed configuration of a command current calculation section in the embodiment of the invention.

FIG. 5 is a block diagram to show the detailed configuration of the command current calculation section 21. As shown in FIG. 5, the command current calculation section 21 includes an assist map with gradient 211, a gradient gain map 212, and a multiplier 213.

The assist map with gradient 211 is a table storing the correspondence relationship between the steering torque T and the basic assist torque To with the vehicle speed S as a parameter and the assist gradient R of the gradient of the correspondence relationship. It outputs a d axis current and a q axis current (hereinafter, the former will be referred to as basic d axis command current iad* and the latter will be referred to as basic q axis command current iaq*) as the basis before correction, to be supplied to the brushless motor 1 corresponding to the basic assist torque To, and also gives the corresponding assist gradient R to the gradient gain map 212.

The gradient gain map 212 is a table storing the correspondence relationship between a gradient gain Ga becoming smaller as the assist gradient R becomes larger and the assist gradient R. Upon reception of the assist gradient R from the assist map with gradient 211, the gradient gain Ga corresponding to the assist gradient R is output.

The multiplier 213 multiplies the basic d axis command current iad* and the basic q axis command current iaq* by the gradient gain Ga, thereby outputting the d axis command current id* and the q axis command current iq* to be supplied to the brushless motor 1. The gradient gain Ga by which the command currents are multiplied becomes smaller as the assist gradient R becomes larger. Thus, the d axis command current id* and the q axis command current iq* suppress degradation of stability of the control system caused by an increase in the assist gradient R by lessening the controlled variable; occurrence of vibration is suppressed.

Figure 6:
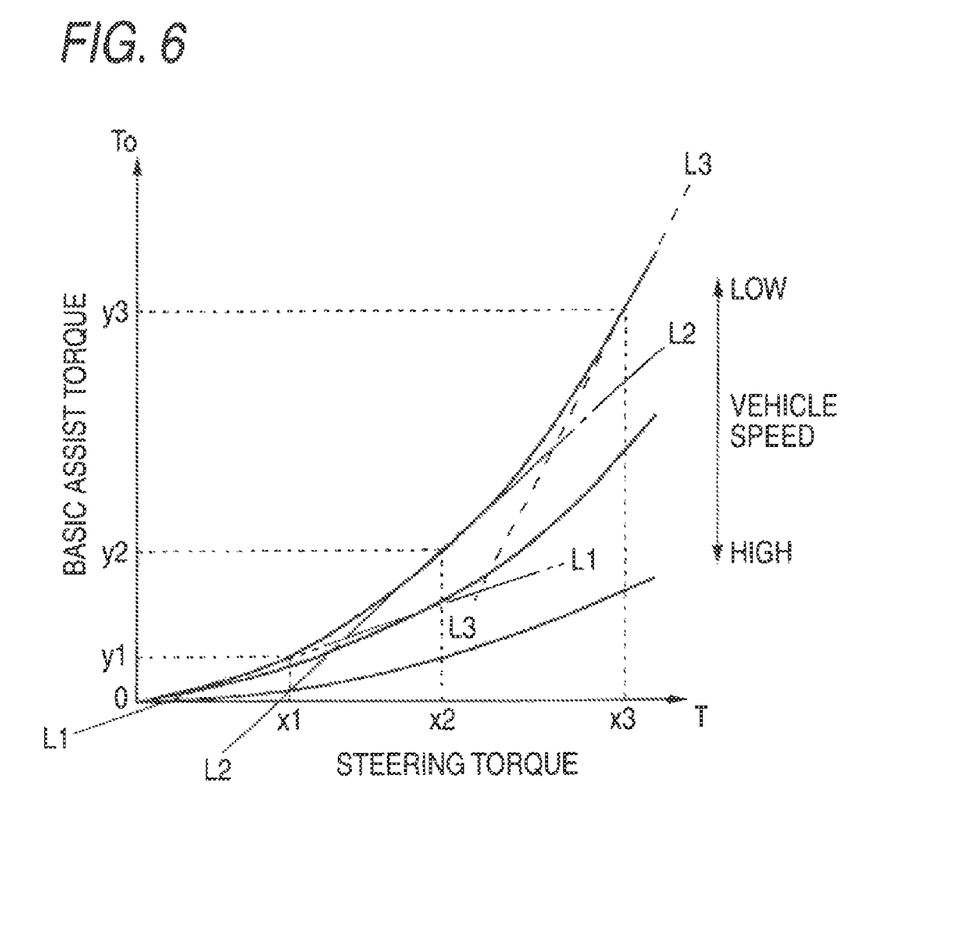
FIG. 6 is a drawing to describe the relationship between a basic assist map and an assist gradient in the embodiment of the invention.

FIG. 6 is a drawing to describe the relationship between the basic assist map and the assist gradient R. Three curves shown in FIG. 6 show the correspondence relationship between the basic assist torque To taken on a Y axis and the steering torque T taken on an X axis about three (typical) cases where the vehicle speed is from low to high. Focusing attention on the curve in the case where the vehicle speed is the lowest, when the value of the steering torque T is x1, the value of the basic assist torque To becomes y1 and the gradient of a tangent L1 at the time becomes assist gradient. It is assumed that the value of the assist gradient R becomes a1. Likewise, when the value of the steering torque T is x2, x3, . . . , the value of the basic assist torque To corresponding thereto becomes y2, y3, . . . and the value of the assist gradient R corresponding thereto becomes a2, a3, . . . , respectively.

Figure 7:
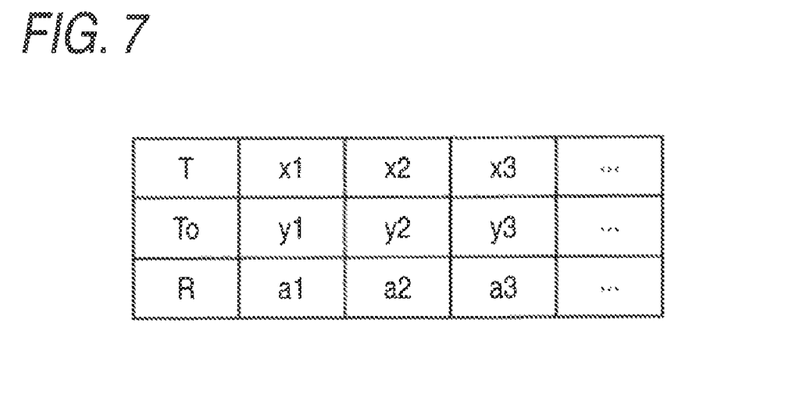
FIG. 7 is a drawing to show an example of an assist map with gradient in the embodiment of the invention.

FIG. 7 is a drawing of a table to show an example of the assist map with gradient thus obtained. In fact, the spacing between the values is set narrower and the value between the values is subjected to linear interpolation according to a known technique. Such an assist map with gradient is created for each predetermined vehicle speed. As shown in FIG. 7, the values of the basic assist torque To and the assist gradient R corresponding to the steering torque T when one vehicle speed S is applied are obtained uniquely. The basic assist torque To thus obtained is converted into the basic d axis command current iad* and the basic q axis command current iaq*, which are then given to the multiplier 213. The assist gradient R is given to the gradient gain map 212.

For convenience of the description, here the basic assist torque To is shown. In fact, however, preferably the assist map with gradient associates the steering torque T and the basic d axis command current iad* and the basic q axis command current iaq* directly with each other. The assist map with gradient 211 may contain the gradient gain map 212 and the gradient gain Ga may be output directly from the assist map with gradient 211.

As described above, in the above-described configuration in which the assist gradient R is previously stored in association with the steering torque T in the form of a table, it is not necessary to calculate the assist gradient R from the basic assist map by performing division operation. Therefore, according to the above-described configuration, the assist gradient R can be calculated at high speed without performing any division operation taking very much time because a divider is not installed in the microcomputer 20 of a general electric power steering system.

<8. Modified Examples>

In the embodiment described above, the abnormal current monitor section 34 for receiving a signal from the first LPF 16 and the sampling acquisition section 24, etc., for receiving a signal from the second LPF 17 are both contained in the microcomputer 20, but at least one of them may be provided by any other microcomputer or circuit than the microcomputer 20.

In the embodiment described above, the average current value acquisition unit for receiving a signal from the first LPF 16 is not limited to the abnormal current monitor section 34 and may be a power calculation unit, etc., (not shown) for calculating the power consumption of a motor. The each-phase current value acquisition unit for receiving a signal from the second LPF 17 is not limited to the sampling acquisition section 24; for example, it may be a Φ value calculation unit (not shown) for finding the Φ value used for the open loop control section 22 described above or any other parameter setting unit.

In the embodiment described above, the open loop control section 22 is used when the abnormal current monitor section 34 for monitoring a failure by receiving a signal from the current sensor 15 in which one resistance element is inserted between the motor drive circuit 13 and the ground point determines that a failure occurs. However, the current sensor 15 may actually detect the currents of the phases of the brushless motor 1 individually by resistors provided in a one-to-one correspondence with the phases, for example, and the open loop control section 22 may be used when the abnormal current monitor section 34 determines that a failure of the current sensor 15, etc., occurs. Either of the open loop control section 22 and the feedback control section 33 may be omitted.

In the embodiment described above, the assist gradient R given to the gradient gain map 212 by the assist map with gradient 211 is used to suppress occurrence of vibration, but the use mode of the assist gradient R is not limited. For example, the phase of the steering torque T may be changed in response to the assist gradient R before it is given to the basic assist map; specifically the phase control characteristic may be changed in response to the assist gradient R so as to lessen the gain in a high frequency band as compared with that before the assist gradient R increases if the assist gradient R increases in the frequency response characteristic of the steering torque T.

The invention can be applied not only to the electric power steering system of column assist type described above, but also to an electric power steering system of pinion assist type and an electric power steering system of rack assist type. The invention can also be applied to a motor controller other than the electric power steering system.

What is claimed is:

1. A motor controller for driving a brushless motor, comprising:
   an inverter circuit which converts a current from a predetermined power supply based on a voltage command value for controlling driving the brushless motor and supplies the conversion result to the brushless motor to drive the brushless motor;

only one current detector provided between the inverter circuit and the power supply for detecting a current given from the power supply to the inverter circuit;

an each-phase current value acquisition unit which acquires a current value of each phase of the brushless motor based on the current detected by the current detector;

a low-pass filter which time-averages the current detected by the current detector;

an average current value acquisition unit which receives the time-averaged current from the low-pass filter; and a controller which finds the voltage command value based on the command current value indicating the current amount to be supplied to the brushless motor and the current value acquired by the each-phase current value acquisition unit.

2. The motor controller according to claim 1, wherein the average current value acquisition unit detects the malfunction if the received current amount is out of a predetermined normal range.

3. The motor controller according to claim 1, wherein the inverter circuit includes a plurality of switch elements, and the low-pass filter has a cutoff frequency lower than a frequency of a pulse signal given to the switch elements.

4. The motor controller according to claim 2, wherein the controller includes:

a feedback controller which performs a feedback control to find the voltage command value;

an open loop controller which performs an open-loop control to find the voltage command value; and a command voltage selector which selects one of the voltage command value output from the feedback controller and the voltage command value output from the open loop controller, wherein when the average current value acquisition unit does not detect the malfunction, the command voltage selects the voltage command value output from the feedback controller, and when the average current value acquisition unit detects the malfunction, the command voltage selects the voltage command value output from the open loop controller.

5. The motor controller according to claim 2 further comprising a fail-safe controller performs fail-safe control when the average current value acquisition unit detects the malfunction.

6. An electric power steering system with a motor controller for driving a brushless motor, comprising:

an inverter circuit which converts a current from a predetermined power supply based on a voltage command value for controlling driving the brushless motor and supplies the conversion result to the brushless motor to drive the brushless motor;

only one current detector provided between the inverter circuit and the power supply for detecting a current given from the power supply to the inverter circuit;

an each-phase current value acquisition unit which acquires a current value of each phase of the brushless motor based on the current detected by the current detector;

a low-pass filter which time-averages the current detected by the current detector;

an average current value acquisition unit which receives the time-averaged current from the low-pass filter; and a controller which finds the voltage command value based on the command current value indicating the current amount to be supplied to the brushless motor and the current value acquired by the each-phase current value acquisition unit.

7. The system according to claim 6, wherein the average current value acquisition unit detects the malfunction if the received current amount is out of a predetermined normal range.

8. The system according to claim 6, wherein the inverter circuit includes a plurality of switch elements, and the low-pass filter has a cutoff frequency lower than a frequency of a pulse signal given to the switch elements.

9. The system according to claim 7, wherein the controller includes:

a feedback controller which performs a feedback control to find the voltage command value;

an open loop controller which performs an open-loop control to find the voltage command value; and a command voltage selector which selects one of the voltage command value output from the feedback controller and the voltage command value output from the open loop controller, wherein when the average current value acquisition unit does not detect the malfunction, the command voltage selects the voltage command value output from the feedback controller, and when the average current value acquisition unit detects the malfunction, the command voltage selects the voltage command value output from the open loop controller.

10. The system according to claim 7 further comprising a fail-safe controller that performs fail-safe control when the average current value acquisition unit detects the malfunction.

* * * * *